Jan. 16, 1951 J. H. LONG 2,538,158
MAGNETIC DEFLECTION GAUGE
Filed March 8, 1946 6 Sheets-Sheet 1

Inventor
JOHN H. LONG.
By
Attorney

Jan. 16, 1951 J. H. LONG 2,538,158
MAGNETIC DEFLECTION GAUGE
Filed March 8, 1946 6 Sheets-Sheet 2

Inventor
JOHN H. LONG.
M. O. Hayes
By
Attorney

Inventor
JOHN H. LONG.
M. O. Hayes
By
Attorney

Patented Jan. 16, 1951

2,538,158

UNITED STATES PATENT OFFICE 2,538,158

MAGNETIC DEFLECTION GAUGE

John H. Long, New York, N. Y., assignor to the United States of America as represented by the Secretary of the Navy Application March 8, 1946, Serial No. 652,909

13 Claims. (Cl. 177—351)

My invention relates to measuring systems and more particularly to accurately and instantaneously indicating and recording the relative displacement between two objects.

In determining the effect of shock, vibration, etc., on equipment subject thereto, it is necessary to have a record of the instantaneous relative position of portions of the equipment. From this record, it is not only possible to ascertain the maximum deflections of the various components of the apparatus but also to determine velocity, acceleration, rate of change of acceleration, etc. From these data, the effect of the disturbance can be evaluated and design changes made accordingly.

It is possible that the distance between two objects may be determined by the use of a magnetic system comprising an exciting coil mounted on one object and excited with a relatively high frequency electric current and a pick-up coil mounted on the other object adapted to respond to the magnetic field produced by current flow in the first coil. Inasmuch as the strength of the magnetic field and hence the induced voltage in the pick-up coil is dependent on the distance from the exciting coil, the induced voltage is a measure of displacement. As the frequency of excitation may be very high, the induced voltage is a practically instantaneous measure of the distance between the two coils and therefore the relative position of the two objects subjected to the shock, vibration, or other disturbance. A record of this voltage therefore provides the desired record of relative displacement.

As a means of measuring displacement, the above mentioned arrangement has several disadvantages. One of these is the capacitive coupling between the two coils. This coupling, due to capacitance between the turns of the coils, between the coils and intermediate objects, and between coils and the power supply leads, introduces a disturbing factor in the calibration of the system and prevents obtaining an accurate record of displacement since the capacitance may be due to changes other than relative displacement.

A second disadvantage of the above measuring systems is the inability of these systems to provide an accurate permanent record of the relative displacement between the two objects. This inability arises from the fact that the induced voltage in the pick-up coil generally changes over an extremely wide range even though the motion of the two coils is small. Hence, under a particular condition of motion, these devices require that an estimate be made of the total displacement to be expected and the scale of the recording equipment set so that a record will always remain in the recording film. This method not only requires a preliminary estimate of the total expected deflection but also obtains a complete record only at the expense of inaccuracy in the lower portions of the range. While this difficulty can be avoided by the use of large record film, the expense and size of this procedure is undesirable.

In accordance with my invention, the above mentioned disadvantages of these magnetic displacement measuring devices are obviated by the use of a balanced exciting and pick-up system, together with a recording system having an automatic scale change.

Use of a balanced excitation system, and pick-up coil, together with a balanced amplifying and recording system, causes the various electrostatic capacitances between the excitation system and the recorder to be neutralized. This prevents the effects of capacitive coupling and renders the entire system independent of changes which alter stray capacitances. In particular, intermediate objects between the pick-up and excitation coil, power supply leads, and other sources of stray capacity may move without producing a changed indication on the recording system.

In accordance with a further aspect of this invention, the accuracy of a distance recording system is improved without the use of a large film size by automatically and instantaneously changing the scale of the recording in accordance with the voltage at the pick-up coil. When this voltage causes the recording to exceed the available film width with the particular amplification in operation, the amplification is automatically decreased in definite steps of known and predetermined size, thereby limiting the record to the available film width and rendering the measurement quantitative for all ranges of amplification, the amplification being known and fixed in each of the several steps, and the particular step employed being readily determinable by inspection of the record, where changes of amplification appear as sudden discontinuities in the trace.

Also in accordance with my invention, the instantaneous change in calibration is achieved by firing a gas discharge tube as the signal to be recorded reaches the limits of the recording film. By causing conduction of the gas discharge tube to prevent operation of an amplifier having a high degree of amplification and simultaneously causing operation of an amplifier having a lower degree of amplification, this change in scale is achieved.

My invention further resides in increasing the effective recording film width to any desired degree by combining separate scale changing systems to act successively as the pick-up coil voltage progressively increases.

My invention further resides in features of construction, combination, and arrangement herein described or disclosed whereby an image is presented on a cathode ray tube representative of the displacement between the two objects in a form suitable for visual observation or recording on a permanent film and in a manner giving instantaneous response.

While the invention is susceptible of various modifications and alternative constructions, I have shown in the drawings and will herein describe in detail the preferred embodiment. It is to be understood, however, that I do not intend to limit the invention by such disclosures for I aim to cover all modifications and alternative constructions falling within the spirit and scope of the invention as defined in the appended claims.

Figure 1:
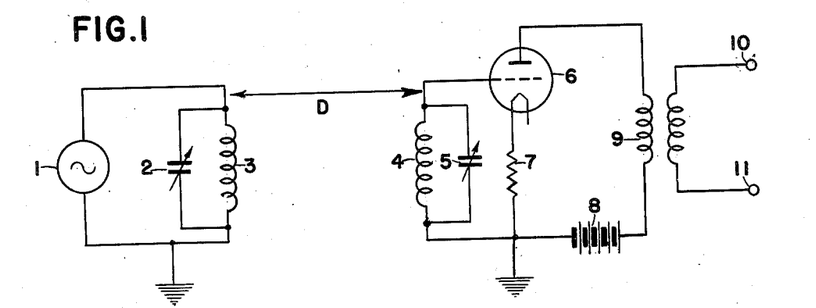
Figure 1 shows a simple diagram of an elementary system for magnetically determining the distance between two objects.

Referring now to Figure 1, generator 1, coil 3, and condenser 2 comprise the exciting system for a magnetic distance measuring device. Coil 3 is caused to resonate at the frequency of generator 1, preferably 10,000 cycles, by the use of shunt condenser 2. This reduces the magnitude of the current required from generator 1 to achieve a particular value of magnetic flux within coil 3 and induced voltage in the pick-up coil. The pick-up system comprises coil 4, condenser 5, tube 6, output transformer 9, resistance 7 and battery 8. Condenser 5 tunes coil 4 to resonance at the frequency of generator 1, thereby producing a maximum voltage at the grid of tube 6 for a particular value of distance between coils 3 and 4. Resistance 7 provides grid bias for tube 6 and battery 8 supplies plate supply potential. Output voltage is taken across terminals 10 and 11 of output transformer 9.

Figure 2:
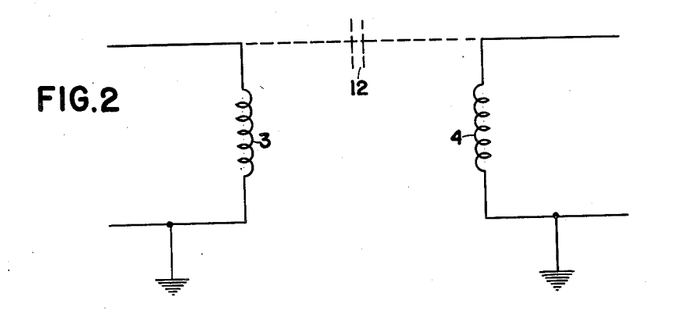
Figure 2 shows how electrostatic capacitance influences the operation of the system shown in Figure 1.

A voltage appearing at the grid of tube 6 comprises two components, one component due to induced voltage in coil 4 due to magnetic flux from exciting coil 3. The second component comprises a voltage at the grid of tube 6 due to electrostatic capacitance between the circuit of the excitation system and tube 6. Figure 2 shows the nature of this capacitance. In the figure, condenser 12 represents the weighted value of capacitance between coils 3 and 4 due to the distributed capacitance between the turns of coil 3 and the turns of coil 4 and to intermediate objects having capacitance to both coils. This condenser is in effect a coupling condenser between the circuit of generator 1 and the circuit of tube 6 and accordingly produces a component in the output voltage at terminals 10 and 11.

Since the capacitance 12 includes in part stray capacitance between the two coils caused by external objects, movement of these objects relative to the coils influences the value of the pick-up voltage. Hence the output voltage at terminals 10 and 11, Figure 1, not only indicates the relative position of coils 3 and 4 but also the position of other objects which are not intended to influence the results. It is for this reason that the magnetic distance recording system shown in Figure 1 is unsatisfactory in operation except under conditions wherein the electrostatic capacitance between the exciting and pick-up systems is negligible.

Figure 3:
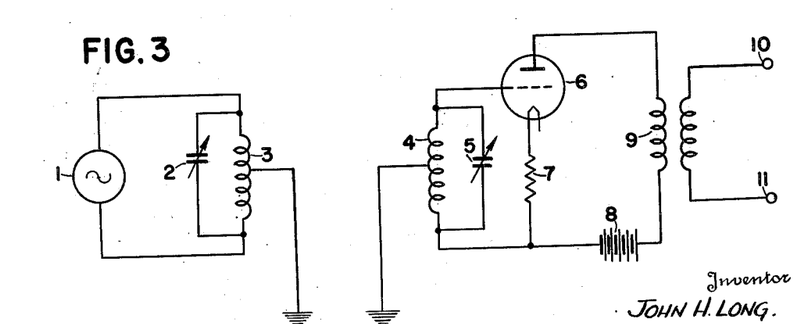
Figure 3 shows a circuit similar to that of Figure 1 but adapted for balanced operation of the excitation and pick-up coils.
Figure 4:
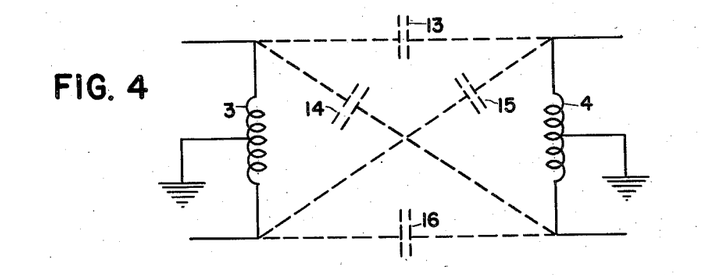
Figure 4 shows the equivalent electrostatic capacitances of the system in Figure 3.

Figure 3 shows a balanced system wherein electrostatic capacitance between coils 3 and 4, due to direct capacitance or due to the presence of adjacent objects, is neutralized. In this circuit, the center taps of coils 3 and 4 are grounded instead of one end as shown in Figure 1. In this case, an equivalent circuit showing the electrostatic capacitance between the grid circuit of tube 6 and the exciting circuit is as shown in Figure 4. On the grid side of coil 4, two capacitance components exist, the first, 13, is between the grid end of coil 4 and one end of coil 3 whereas the other, 15 is between the grid end of coil 4 and the opposite end of coil 3. Similarly, the cathode end of coil 4 is coupled by capacitances 14 and 16 to the opposite ends of coil 3. Inasmuch as the voltage appearing at the opposite ends of coil 3 are 180° out of phase and capacitances 13 and 15 and 14 and 16 are nearly identical, the value of induced voltage in the grid circuit of tube 6 due to electrostatic capacitance is negligible and the output voltage at terminals 10 and 11 is not influenced by this capacity.

Figure 5:
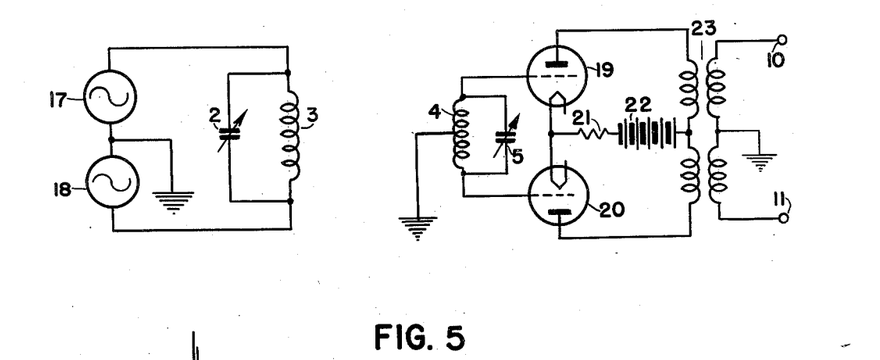
Figure 5 shows an alternate method whereby the operation of a magnetic distance measuring system may be balanced with respect to capacity couplings.

Figure 5 shows an alternate method whereby balanced operation of a magnetic distance measuring system may be secured. In the figure, the generator 1 of Figure 1 is replaced by two generators 17 and 18 having a grounded common terminal and producing equal voltages having a 180° phase relation. This may be accomplished by the use of a conventional push-pull oscillator circuit or by a balancing circuit connected to a single ended oscillator. In either case, or in the showing of Fig. 3, excitation of the exciting coil 3 is made equal and opposite at the two ends thereof, or about the electrical impedance center of the coils. Coil 4 is likewise excited symmetrically about its impedance or electrical center. In addition to this modification, Figure 5 illustrates the use of a push-pull amplifier circuit attached to coil 4. In this case the grid circuits of tubes 19 and 20 are connected to opposite ends of coil 4 and push-pull output transformer 23 used. Plate supply voltage for tubes 19 and 20 is supplied from battery 22 and grid bias supplied from resistance 21. This push-pull circuit has the advantage of being balanced throughout with respect to ground so that leads to filament circuit, plate voltage supply circuit etc., produce no unbalanced capacities to the exciting system which may influence the results.

Figure 6:
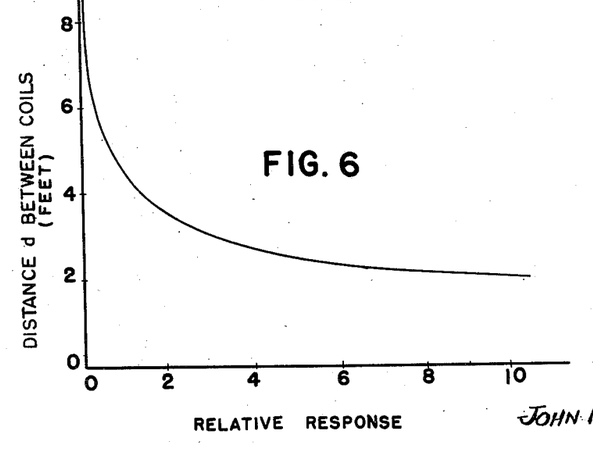
Figure 6 shows the response of a system such as that of Figure 5.

Figure 6 shows a response curve typical of that obtained from a system such as shown in Figure 5. The figure shows the relative response which may be obtained in an impedance connected across terminals 10 and 11 or voltage at these terminals for various values of distance between the two coils. It is evident from the curve that a relatively great change in distance when the coils are separated produces the same change in response as a relatively small change in distance when the coils are close together. Hence to achieve a particular accuracy in measuring the distance between the coils, it is necessary to have an extremely accurate measurement of current at the low value of current as compared with the accuracy of measurement at relatively high values of current. For this reason, conventional recording systems will not provide satisfactory operation with a system such as that of Figure 5.

Figures 7, 13:
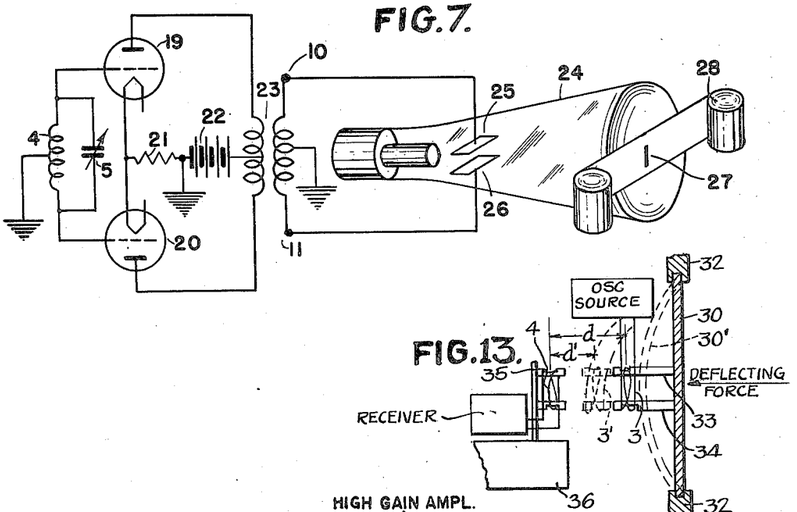
Figure 7 shows a partially schematic and partially isometric view of a recording system adapted for use with a magnetic distance measuring system.
Fig. 13 illustrates a simple embodiment of the invention for measurement of instantaneous deflections of a plate.

A recording system adapted for use in connection with a system such as that of Figure 5 is shown in Figure 7. In the figure, 24 is a cathode ray tube having horizontal deflection plates 25 and 26 connected to output terminals 10 and 11. Signals from generating coil 3 are impressed on pick-up coil 4 and appear as an alternating voltage across deflection plates 25 and 26, thereby causing a vertical motion of the cathode ray tube beam in accordance with the magnitude of the induced voltage. Since the beam has no horizontal motion across the screen, the image appears as a line as shown at 27. By providing film 28 moving at a rapid rate across the image 27, a record is obtained of the changes in magnitude of this image.

With a film 28 of reasonable dimensions, it is not possible to obtain an accurate record of displacement between coils 3 and 4 if any reasonably large change in displacement takes place. The cause of this is evident from examination of Figure 6. Suppose, for instance, the distance between the coils changes from 8 feet to 2 feet at a uniform rate. In this case, the change from 8 feet to 6 feet will cause a change in output signal 27 of .1 to .4 units, a change of .3 units. On the other hand, the change from 4 feet to 2 feet involves a change of 1.2 to 10 units, a total difference of 8.8 units, almost 30 times as great. It is, therefore, necessary to measure displacement in part of the scale range to an accuracy 30 times as great as the rest of the range.

Figure 8:
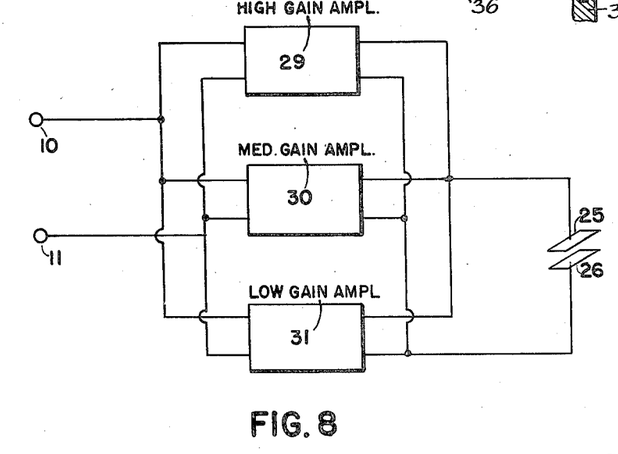
Figure 8 shows in block form how I accomplish an automatic scale change of the recording system.

I have found that the need for a large film 28 may be avoided by an automatic switching system adapted to change the scale of image 27 progressively in accordance with the value of the voltage at terminals 10 and 11. This system is shown in block form in Figure 8. Attached to terminals 10 and 11 are a number of amplifiers, such as the three amplifiers 29, 30 and 31. The output of these amplifiers is connected directly to cathode ray tube deflection plates 25 and 26. Amplifier 29, for instance, is adapted to operate with a high degree of amplification so that when low values of input signals appear across terminals 10 and 11, a relatively large deflection of the cathode ray tube mean is obtained if this amplifier is operating. Amplifier 30, for instance, is adapted to produce an intermediate amount of amplification so that the deflection of the cathode ray tube beam is somewhat smaller for the same signals at terminals 10 and 11 than is the case of amplifier 29. Similarly, amplifier 31 is of even lower amplification so that the three amplifiers together provide a large range of successive amplification and permit readable signals on the recording film over a very large range in voltage appearing across points 10 and 11. In addition to providing amplifiers 29, 30, and 31 with different values of amplification, I provide a progressive automatic switching system whereby only amplifier 29 is caused to be operative when signals within its most effective range are received, and amplifier 31 operates when signals within its most effective range are received. Hence, the system automatically adjusts itself to provide output signals within the scale range of film 28, Figure 7, even though the variation in voltage at terminals 10 and 11 is extremely large.

Figure 9:
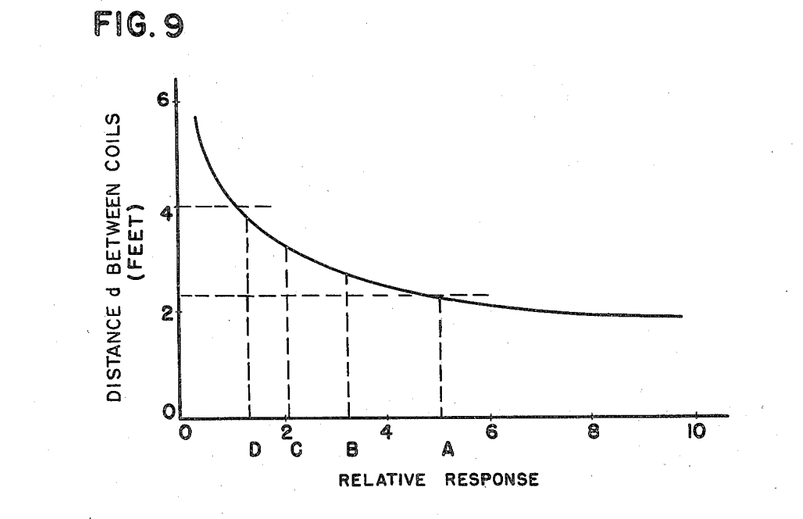
Figure 9 shows how the response curve of the magnetic distance recording system is divided for an automatic scale change.

Now referring to Figure 9, the method of establishing the amplifier ranges is shown in detail. Suppose, for instance, the distance between the pick-up coils and the transmitting coils varies from 2.5 feet to 4 feet and it is desired to cause the system to record the variation in voltage output in three progressive stages having equal percentage accuracy. To do this, I set amplifier 29 to operate between output signals D and C, Figure 9; amplifier 30 to operate between output signals C and B, Figure 9; and amplifier 31 to operate between output signals B and A, Figure 9. These four values of output signal setting are arranged in geometric series relationship so that the same ratio exists between C and D, B and C, and A and B.

Figure 10:
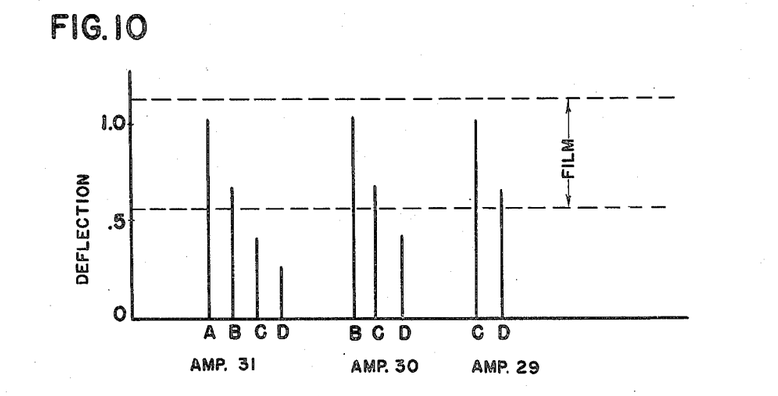
Figure 10 shows how displacements appear on the film of Figure 7.

Figure 10 shows in detail the appearance on the recording film of various signals corresponding to the limits of operation of the three amplifiers and with the three amplifiers in operation. From the figure, it is evident that with amplifier 31 in operation (low amplification) signals A and B appear within the range of the recording film, but that signals C and D are too small to appear thereon. On the other hand, with amplifier 30 in operation (intermediate amplification) signals B and C appear on the film but signal D is too small to appear on the film and signal A is too large. If amplifier 29 is operating (maximum amplification) signals C and D appear on the film but signals A and B extend completely across it and do not result in any usable indication.

Figure 11:
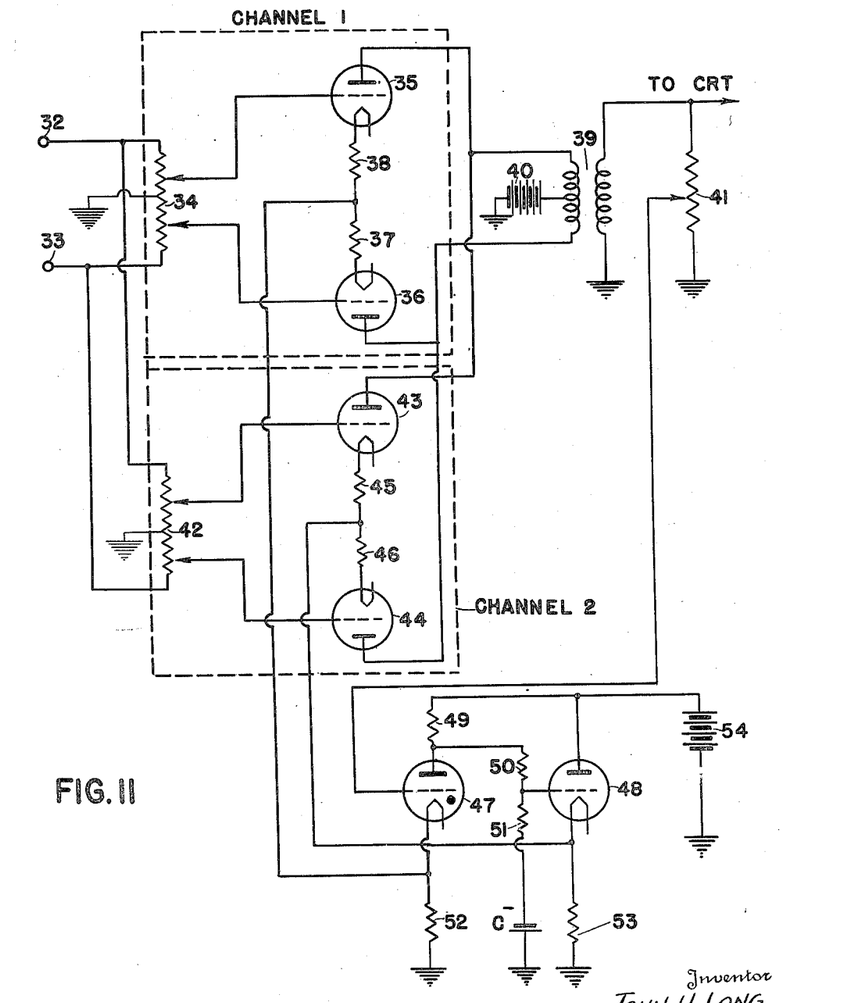
Figure 11 shows a schematic circuit of a two-scale automatic system.

Figure 11 shows a circuit diagram of a two channel amplifier adapted for automatic switching in accordance with my invention. In the figure, terminals 32 and 33 comprise input terminals which would ordinarily be connected to terminals such as 10 and 11, Figure 7. Potentiometer 34 is connected to terminals 32 and 33 and supplies grid voltage to tubes 35 and 36. Cathode bias for these tubes is supplied by resistances 37 and 38, together with resistance 52. Plate supply voltage for these tubes is supplied through battery 40 and the primary winding of output transformer 39. The second channel comprises tubes 43 and 44 fed from terminals 32 and 33 by potentiometer 42. Cathode resistances 45 and 46, together with resistance 53, provide cathode bias for this channel. Plate supply voltage is derived from battery 40 in the same manner as in the case of tubes 35 and 36. Output signals from both channels are applied to transformer 39 having its secondary connected to the deflection plates of a cathode ray tube.

In order to automatically switch from channel 1, Figure 11, to channel 2, the tubes 47 and 48 and the associated circuits are provided. Tube 47 is a gas discharge tube having its cathode circuit connected by resistance 52 to ground and its grid connected by potentiometer 41 to the output voltage of transformer 39. Plate supply voltage for tube 47 is supplied from battery 54 and resistance 49. Tube 48 is a vacuum tube having its grid connected by the resistances 50 and 51 into the plate circuit of tube 47 and its cathode connected by resistance 53 to ground. Plate supply voltage for tube 48 is supplied directly from battery 54. The cathode of tube 47 is connected to the cathodes of tubes 35 and 36 by resistances 38 and 37 whereas the cathode of tube 48 is connected by resistances 45 and 46 to the cathodes of tubes 43 and 44.

Operation of the circuit of Figure 11 is as follows. When output voltage across transformer 39 is below a predetermined level established by the characteristics of tube 47, the setting of potentiometer 41, and the value of voltage of battery 54, tube 47 never reaches the firing point. Hence, no plate current passes through the tube 47 and the grid of tube 48 is at a high positive potential determined by battery 54 and resistors 49, 50 and 51. Hence, tube 48 draws a high space current, resulting in a large value of voltage drop across resistance 53 which in turn biases tubes 43 and 44 beyond the cut-off point and prevents operation of channel 2. Inasmuch as no space current passes through tube 47, the voltage drop across resistance 52 is only that due to operation of tubes 35 and 36 and amplifier channel 1 operates in the normal manner. Hence, so long as the output voltage of transformer 39 is below the predetermined level, only channel 1 is operative and the deflection of the cathode ray tube beam corresponds to the amplification in this channel.

When the output voltage appearing across transformer 39 exceeds the value required to fire gas discharge tube 47, space current flows therethrough. This current causes a voltage drop across resistance 52, thereby biasing tubes 35 and 36 beyond the cut-off point and preventing operation of the amplifier channel 1 associated with these tubes. In addition, the space current flow through tube 47 causes a voltage drop in resistance 49 which reduces the grid voltage at tube 48 thereby reducing space current flow therethrough to the point at which negligible voltage drop is produced in resistance 53. Hence, amplifier channel 2 is operative and a deflection at the cathode ray tube corresponding to the amplification of this channel is obtained. By properly setting the values of potentiometer 34 and 42, together with potentiometer 41 and the characteristics of the circuit of tube 47, the range of the two channels is established to divide the range of the output voltages in a manner providing maximum optimum performance. Inasmuch as the circuit is instantaneous in operation, the change is completely automatic and I obtain a useful record over the entire range of input signals.

Figure 12:
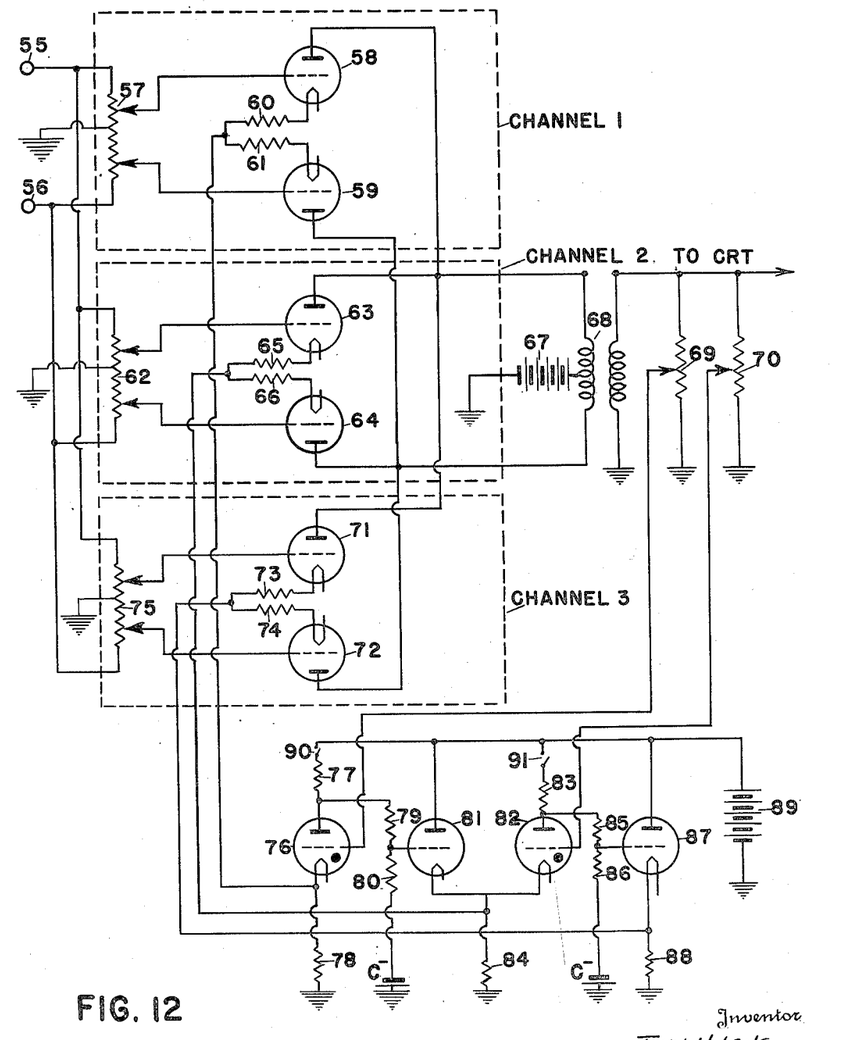
Figure 12 shows a schematic circuit diagram of an automatic system adapted to change the scale range automatically over three different scales.

Figure 12 shows a schematic circuit diagram of a system utilizing three amplifier channels having automatic switching circuits which provide progressive operation in accordance with increasing signal level. In the figure, input signals are supplied to terminals 55 and 56 which in turn are connected to potentiometers 57, 62 and 75 leading to the three separate amplifier channels. Tubes 58 and 59 comprise the first amplifier channel. The control grids of these tubes are connected to potentiometer 57 and the cathodes to bias resistances 60, 61 and 78. Tubes 63 and 64 comprise the second amplifier channel, being connected to potentiometer 62 and cathode resistances 65, 66 and 84. Tubes 71 and 72 comprise the third amplifier channel. The control grids of these tubes are connected to potentiometer 75 and the cathodes to resistances 73, 74 and 88. Output transformer 68, together with plate supply source 67, is connected to all three amplifier channels. The secondary of output transformer 68 leads to the cathode ray tube deflecting circuit and to potentiometers 69 and 70. The automatic selection system comprises tubes 76, 81, 82 and 87 and their associated circuits. Tubes 76 and 82 are gas discharge tubes having their grids connected to potentiometers 69 and 70. The plate of tube 76 is connected through resistance 77 and switch 90 to plate supply voltage source 89. The grid of tube 81 is connected by resistances 79 and 80 to the plate of tube 76. The plate of tube 81 is connected directly to the plate supply voltage source 89. The cathodes of tubes 81 and 82 are connected to common cathode bias resistance 84. The anode of tube 82 is connected by resistance 83 and switch 91 to plate supply voltage 89. The grid of tube 87 is connected by resistances 85 and 86 to the plate circuit of tube 82.

Operation of the system shown in Figure 12 is as follows. With switches 90 and 91 closed and gas discharge tubes 76 and 82 in the non-conducting condition, input signals at terminals 55 and 56 below a predetermined level will not cause a sufficient voltage to appear at tube 76 to cause it to conduct. Hence, no space current due to tube 76 passes through resistance 78 and the operation of the channel comprising tubes 58 and 59 is normal. Inasmuch as the grid of tube 81 is provided with a high positive potential by reason of the circuit comprising resistances 77, 79 and 80, a large space current flows through this tube, thereby causing a high voltage drop in resistance 84 which cuts off plate current flow in tubes 63 and 64 and prevents operation of the amplifier channel No. 2. Similarly, tube 87 draws a high value of plate current, thereby preventing operation of tubes 71 and 72 and channel No. 3. When the output voltage of transformer 68 reaches a predetermined value, tube 76 fires, thereby causing plate current flow through resistance 78 and biasing tubes 58 and 59 beyond the cut-off point. Operation of channel No. 1 is thereby prevented. The voltage drop in resistance 77 reduces the grid voltage at tube 81 below the cut-off point, thereby reducing the voltage drop in resistance 84 to the point at which amplifier channel No. 2 (tubes 63 and 74) is operative. If the voltage appearing at terminals 55 and 56 further increases to the point at which output voltage from transformer 68 is sufficient to fire tube 82, plate current flow takes place through this tube, thereby causing voltage drop in resistance 84 sufficient to bias tubes 63 and 64 to the cut-off point and preventing operation of channel No. 2 of the amplifier. However, the voltage drop in resistance 83 is sufficient to cause decreased plate current flow in tube 87 and reduce the bias of tube 71 and 72 below the cutoff point. Operation of channel No. 3 is then possible. Hence, the three amplifiers are automatically switched to change the scale range of the cathode ray tube in accordance with the variation in input voltage at terminals 55 and 56, the changes taking place when the input signals reach predetermined levels.

Adjustment of the amplifiers in Figure 12 is obtained by changing the resistance values at potentiometers 57, 62 and 75. These are adjusted until the overall amplification of the three amplifiers is such as to provide overall amplification values as shown in Figure 10. The transition from one amplifier to the next is controlled by the setting of potentiometers 69 and 70, together with the characteristics of tubes 82 and 76 and the value of voltage source 89. These values I adjust so that the transition occurs at voltage values B and C, Figure 9. Hence, as the output voltage changes from point D, Figure 9 through points C and B to A, Figure 9, the three amplifier channels are successively operated. When the various amplifiers are brought into operation, a sudden change in the trace on the recording film will be shown which can be used to indicate the change. Hence, a large range in output signals is recorded on a film of small area. Switches 90 and 91 serve as manual reset means.

The amplifiers are switched on successively according to either an increasing or decreasing level of amplification. The circuits may be designed to measure objects moving toward each other or away from each other. The circuits shown, however, are not automatically reversible and the same circuit may not be used for both movements without modification.

A simple embodiment of the invention is illustrated in Fig. 13 wherein the plate 30 is mounted in blocks as at 32 and has thereon the pillars 33 and 34 on which is secured the one or more loops of the coil 3, energized from high frequency source 1 or 17 and 18 or other oscillation source. The pick-up coil 4 is shown similarly mounted on a fixed base 36 by supporting structure 35, and connected to the receiver circuit. Any initial separation of coils 3 and 4 may be designated $d$, and a displaced position of plate 30 is shown at 30' with a corresponding displaced position of coil 3 at 3', the separation thereof from coil 4 being illustrated at $d'$. The difference between $d$ and $d'$ is a measure of deflection, and since the device illustrated in Figs. 3 and 5 provides an instantaneous measure of this distance at all times, it measures deflections as a very fast acting deflection gauge.

It should also be observed that the grounding of the electrical center of the exciting coil confines or limits the excitation of the coil to equal and opposite voltage and current relationships about the grounded point. Excitation as in Fig. 5 similarly confines excitation symmetrically about the impedance center of the coil, since equal and opposite excitation at the ends of the coil is achieved. In either case the impedance center of the coil remains substantially at ground potential and the capacitative effects of the coil are cancelled out to permit passage of high frequency current, and recording of sudden transient deflections resulting, for example, from nearby explosions.

I claim:

1. A magnetic deflection gauge comprising an exciting coil energized at a high frequency and tuned to resonance at said frequency having its electrical center point at ground potential, a pick-up coil tuned to the same frequency and having the electrical center thereof grounded, and a voltage measuring circuit connected across said pick-up coil, said measuring circuit being thereby actuated in proportion to the instant separation of said coils.

2. A magnetic deflection gauge comprising an exciting coil energized at a high frequency and tuned to resonance at said frequency having its center point at ground potential, a pick-up coil tuned to the same frequency, a voltage amplifying and measuring circuit, said pick-up coil being electrically connected to said voltage amplifying and measuring circuit and having its electrical impedance center point at ground potential, and electronic switching means in said circuit operative in response to a predetermined voltage in the pick-up coil to alter the degree of said amplification by a fixed ratio, whereby measurement of deflection is rendered quantitative over a plurality of sensitivities of the gauge.

3. A magnetic deflection measuring gauge comprising a tuned exciting coil, means including an alternating current generator for energizing opposite ends of said coil equally and oppositely about the electrical impedance center thereof, a pick-up coil tuned to the frequency of the exciting coil and grounded at the electrical center thereof, and a voltage measuring circuit said pick-up coil being connected to said voltage measuring circuit in proportion to the instant separation of said coils.

4. A magnetic deflection measuring gauge comprising a source of high frequency alternating current, an exciting coil connected to said source and tuned to resonance therewith, having its electrical center point at ground potential, a cathode ray deflector system, a pick-up coil tuned to resonance with the exciting coil connected to actuate said cathode ray deflector system, said system being balanced with respect to ground potential, and means responsive to the instantaneous output of said system to reduce said output by a predetermined ratio, said means actuated when a predetermined instantaneous output occurs, whereby the cathode ray deflector quantitatively measures said deflection through a plurality of ranges of gauge sensitivity.

5. A magnetic deflection measuring gauge comprising a tuned exciting coil, a generator adapted to actuate said coil and having its electrical impedance center point at ground potential, a pick-up coil tuned to resonance at the frequency of current from said generator, a cathode ray beam deflector, said deflector being responsively connected to said pick-up coil and balanced with respect to ground potential, means responsive to instantaneous signals at said deflector to reduce the output of said deflector by predetermined amounts when a predetermined signal valve is reached.

6. A magnetic gauge system for measuring the displacement of an object comprising a transmitting coil mounted on the object, a generator for exciting said coil with current of high audio frequency, means applying said excitation at opposite ends of said exciting coil equally and oppositely about the impedance center thereof for minimizing the effect of the electrostatic field generated by said coil on said system, a receiving coil located within the effective electro-magnetic field of the transmitting coil and, means for measuring and time recording changes in current intensity in the receiving coil.

7. A magnetic gauge for measuring the displacement of an object comprising a transmitting coil energized equally and oppositely about an impedance center thereof, said impedance center being at ground potential and said coil being mounted on the object, a receiving coil centrally grounded and located within the effective electromagnetic field of the transmitting coil, an amplifier for the current induced in the receiving coil, a tube responsive to the output of the amplifier adapted in the conducting condition to bias said amplifier to cut-off when a predetermined output is reached, a second amplifier having a common input and output circuit with the first amplifier, a second tube adapted to bias the second amplifier to cut-off when the first tube is non-conducting, and a cathode ray tube having its deflection plates actuated by the amplified current.

8. A magnetic gauge for measuring the displacement of an object comprising a transmitting coil symmetrically energized about the electrical impedance center thereof and mounted on the object, a receiving coil centrally grounded and located within the effective electromagnetic field of the transmitting coil, an amplifier for the current induced in the receiving coil, a tube responsive to the output of the amplifier adapted in the conducting condition to bias said amplifier to cut-off when a predetermined output is reached, a second amplifier having a common input and output circuit with the first amplifier, a second tube adapted to bias the second amplifier to cut-off when the first tube is non-conducting, means for varying the cut-off points, manual means to reset the amplifier circuits, and a cathode ray tube having its deflection plates actuated by the amplified current.

9. A magnetic deflection gauge comprising an exciting coil energized at high frequency in a circuit and tuned to resonance at said frequency, means including at least one ground connection in said circuit limiting excitation of current and voltage in opposite ends of said coil symmetrically about ground potential, and a pick-up coil tuned to resonance at said frequency and grounded at the electrical center thereof, said pick-up coil adapted to actuate a voltage measuring circuit in proportion to the instant separation of said coils.

10. A magnetic deflection gauge comprising relatively moveable exciting and excited coils, a high frequency power source connected to and energizing said exciting coil symmetrically about the electrical impedance midpoint thereof, said exciting and excited coils being tuned to the frequency of said source, voltage amplifying and indicating means responsive to the excitation of the excited coil in proportion to the instant spacing of said coils, and means centrally grounding said excited coil for symmetrical excitation about the electrical impedance midpoint thereof.

11. The deflection gauge of claim 10 wherein said voltage amplifying and indicating means is arranged in push-pull about an electrical midpoint of impedance, said midpoint being substantially at ground potential, whereby the current and voltage relations are substantially symmetrical about ground potential for minimizing capacitance effects on said gauge.

12. In a gauge for measuring the momentary distance of an object from a fixed position, a coil tuned at a fixed frequency and mounted on said object in fixed spacial relation thereto, means energizing said coil at said fixed frequency, the impedance center point of the coil being substantially at ground potential and the ends thereof being equally and oppositely energized, a tuned stationary coil at said fixed position disposed parallel to said energized coil for picking up varying voltages therein in accordance with the instantaneous distance between said coils, means grounding said stationary coil at the impedance center thereof for minimizing capacitative losses in said voltages, and means measuring the magnitude of said voltages.

13. In a deflection gauge for measuring transient displacements of an object relative to a fixed position, an exciting coil tuned to a fixed frequency and mounted on said object, a source of alternating current of said frequency applied symmetrically about the impedance center of the coil, a pick-up coil mounted at said fixed position and coupled to said exciting coil variably in accordance with the instant separation of the coils, said pick-up coil being tuned to said frequency and grounded at the electrical impedance center thereof, and a push-pull amplifying circuit connected to said pick-up coil and having an output substantially symmetrical about ground potential, whereby capacitative effects between components of said coils and amplifier are minimized.

JOHN H. LONG.

REFERENCES CITED

The following references are of record in the file of this patent:

UNITED STATES PATENTS

| Number | Name | Date |
|---|---|---|
| 2,103,262 | Knerr | Dec. 28, 1937 |
| 2,261,541 | De Sart | Nov. 4, 1941 |
| 2,295,410 | Kreuzer | Sept. 8, 1942 |
| 2,340,609 | Mestas | Feb. 1, 1944 |
| 2,374,204 | Hoover | Apr. 24, 1945 |
| 2,379,513 | Fisher | July 3, 1945 |